J. I. HERRICK.
Heating Stove.
No. 34,752. Patented March 25, 1862.
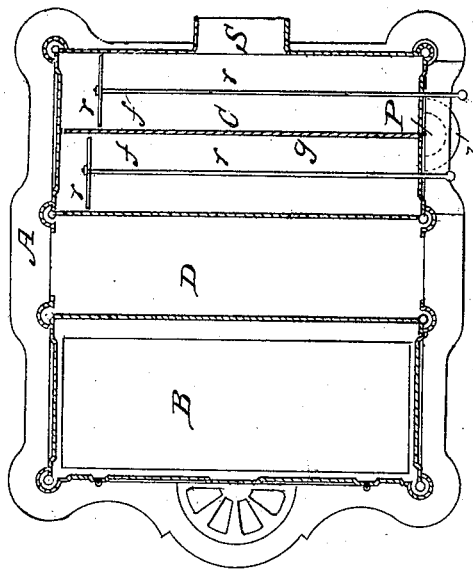
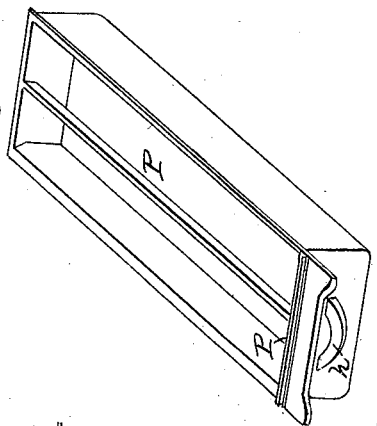
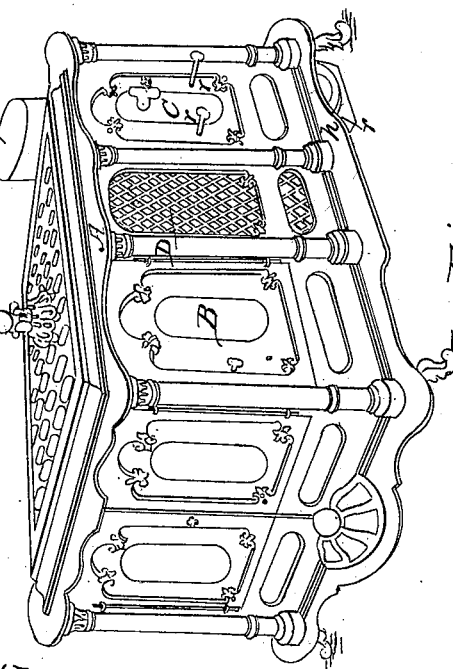
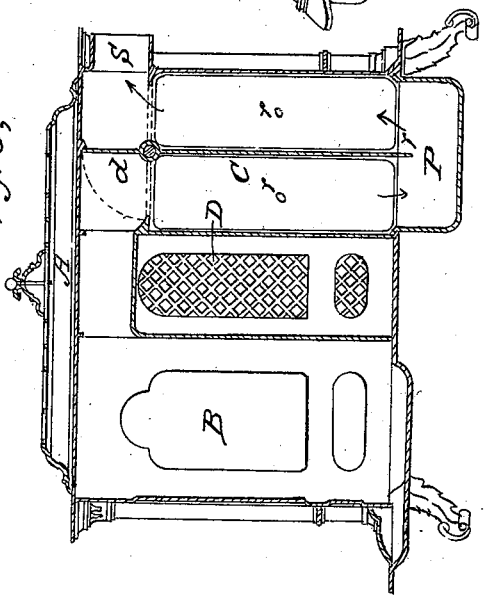
WITNESSES:
INVENTOR:
John I. Herrick

UNITED STATES PATENT OFFICE.

JOHN I. HERRICK, OF MILWAUKEE, WISCONSIN.

IMPROVEMENT IN STOVES.

Specification forming part of Letters Patent No. 34,752, dated March 25, 1862.

*To all whom it may concern:*

Be it known that I, JOHN I. HERRICK, of the city of Milwaukee, in the county of Milwaukee and State of Wisconsin, have invented a new and Improved Construction of a Heating-Stove; and I do hereby declare that the following is a full and exact description thereof, reference being had to the accompanying drawings, and to the letters marked thereon.

The stove A is constructed of a part B, in which the fire-chamber is contained, and of a part C, containing the circulating smoke and heat flues $f f$. Between these two parts is a partially-open space D, by which the heating-surface of the stove is enlarged. Beneath the part C, Figure 3, is a pan P, attached to and forming part of the stove and flues. When the damper $d$ is open, as shown by dotted lines on Fig. 3, the heat escapes directly into the smoke-pipe S. The circulating smoke and hot-air flues, going up and down or vertically, may be cleaned by scrapers $r r$, and the pan P, with its contents, can be removed and cleaned. Instead of the pan P, the partition-plate $g$, that forms a partition between descending and ascending flues, may be shortened at the bottom, so that the pan would not be needed to form part of the flues, but the bottom of the flues formed either by a slide or a movable piece, like a damper, the opening of which would admit of the soot falling from the flues. Either of these would answer, and are regarded as set forth in the subjoined claim.

When there are but two flues, partitions are not needed in the pan; but when there are more than two flues partitions in the pan are needed and used. It is not intended to be limited to any particular form of the flues or order in arranging them.

The space D is partially inclosed at the ends to produce and preserve a symmetrical appearance and admit of ornament.

What I claim as my invention, and desire to secure by Letters Patent, is—

The flues $f f$, removable pan P, heating-space D, when combined with a heating-stove, constructed and arranged to operate as described.

JOHN I. HERRICK.

Witnesses:
CYRUS CHILD,
E. C. HIBBARD.